United States Patent
Meadows

(10) Patent No.: US 6,238,722 B1
(45) Date of Patent: May 29, 2001

(54) METHOD FOR PRODUCING FINELY GROUND KAVA ROOT

(76) Inventor: Timothy Meadows, 6901 Pleasant Rock Rd., Colleyville, TX (US) 76014

( * ) Notice: Subject to any disclaimer, the term of this patent is extended or adjusted under 35 U.S.C. 154(b) by 0 days.

(21) Appl. No.: 09/266,054

(22) Filed: Mar. 10, 1999

(51) Int. Cl.$^7$ ........................................................ A23F 5/00
(52) U.S. Cl. ............................................ 426/596; 426/590
(58) Field of Search ...................................... 426/590, 596

(56) References Cited

U.S. PATENT DOCUMENTS

| | | |
|---|---|---|
| 1,789,334 | 1/1931 | Englung . |
| 2,422,944 | 6/1947 | Bogoslowsky .......................... 99/286 |
| 2,583,697 | 1/1952 | Hendry, Jr. et al. .................... 99/140 |
| 2,827,845 | 3/1958 | Richeson ................................ 99/289 |
| 2,955,768 | 10/1960 | Engi ........................................ 241/66 |
| 3,107,600 | 10/1963 | Brun-Buisson ........................ 99/286 |
| 4,007,675 | 2/1977 | Cailliot et al. .......................... 99/286 |
| 4,187,992 | 2/1980 | Del Valle ................................ 241/65 |
| 4,510,853 | 4/1985 | Takagi .................................... 99/286 |
| 4,605,175 | 8/1986 | Weber .................................... 241/56 |
| 4,967,649 | 11/1990 | Ephraim et al. ....................... 99/286 |
| 5,058,814 | 10/1991 | Ephraim et al. ................. 241/152 A |
| 5,211,948 | 5/1993 | Cerise et al. ...................... 424/195.1 |
| 5,230,889 | 7/1993 | Inoue ................................ 424/195.1 |
| 5,296,224 | 3/1994 | Schwabe .......................... 424/195.1 |
| 5,770,207 | * 6/1998 | Bewicke . |

* cited by examiner

Primary Examiner—Anthony J. Weier
(74) Attorney, Agent, or Firm—Kenneth C.. Hill

(57) ABSTRACT

A method for preparing Kava root involves a multi-stage grinding process to give a resulting very small particle size. Because Kava root is fibrous, and tends to catch fire when ground extremely small, an ambient nitrogen atmosphere is provided during one or more stages of the grinding process to prevent combustion. The resultant very finely ground Kava powder is preferably mixed with other materials, such as ascorbic acid and other food-grade acids, to remove the objectionable taste.

10 Claims, No Drawings

METHOD FOR PRODUCING FINELY GROUND KAVA ROOT

BACKGROUND OF THE INVENTION

1. Field of the Invention

The present invention relates generally to grinding of fibrous food products, and more specifically to very fine grinding of Kava root.

2. Description of the Prior Art

Kava root is an herb which is becoming more popular as a social drink. It may be used as a nonprescription treatment for anxiety. Kava is the root of the piper methysticum plant, which is native to Malasia and the Polynesian Islands.

Traditionally, Kava has been rough ground and used to form a drink through infusion. This process is similar to the brewing of coffee by infusing hot water through relatively large coffee grounds. This process is wasteful, because a significant amount of the active ingredients in the raw Kava remain behind in the ground root. Thus, a relatively expensive material is used in an inefficient manner.

Further, the resulting infusion has a very strong taste. This taste is objectionable to those who have not grown up with the drink and developed a taste for it.

It would be desirable to provide improved techniques for preparing Kava root. Preferably, these techniques would enable Kava root to be ground extremely fine so that a much greater percentage of the active ingredients can be extracted. It would also be desirable to provide a ground Kava root product which did not have the traditional objectionable taste.

SUMMARY OF THE INVENTION

In accordance with the present invention, a method for preparing Kava root involves a multi-stage grinding process to give a resulting very small particle size. Because Kava root is fibrous, and tends to catch fire when ground extremely small, an ambient nitrogen atmosphere is provided during one or more stages of the grinding process to prevent combustion. The resultant very finely ground Kava powder is preferably mixed with other materials, such as ascorbic acid and other food-grade acids, to remove the objectionable taste.

DESCRIPTION OF THE PREFERRED EMBODIMENT

The novel features believed characteristic of the invention are set forth in the appended claims. The invention itself however, as well as a preferred mode of use, further objects and advantages thereof, will best be understood by reference to the following detailed description of an illustrative embodiment.

In accordance with a preferred embodiment, commercially available Kava root is ground in a three-stage process to a very fine powder. This powder can then be used in drinks or other foods to provide a relaxing food or beverage.

A preferred technique for grinding the Kava root uses a three-stage grinding process. The first stage is a rough grinding to granulate the Kava root, resulting in ground root having a particulate size of approximately ¼" diameter. This initial grinding may be done in any suitable grinding equipment. A typical example is generally referred to as a granulator, and uses rotating blades to chop the Kava root into appropriate size particles.

In the preferred preparation technique, the second and third stages take place in a hammer mill. Although any suitable equipment can be used, a suitable piece of equipment is a Model B PULVA-SIZER available from the Pulva Corporation of Saxonberg, Pa. The Model B hammer mill has 24 hammers laid out in 12 rows.

A single hammer mill may be used for both the second and third grinding stages, with the ground root being run through in alternating batches. Of course, two separate machines may be used if desired. During the second grinding stage, the first stage within the hammer mill, the mill screen used is preferably a perforated metal screen having 0.093" round holes. An appropriate screen can be made of 12 gauge steel. The third grinding stage, the second within the hammer mill, preferably uses a 0.020" herringbone slot screen to result in very finely ground Kava powder. Both of these screens are available as standard screens for the Model B hammer mill described above.

In order to properly prepare ground Kava root, several modifications have preferably been made to the standard Model B hammer mill. The first of these changes is to slow down the feed rate of Kava into the hammer mill by a significant amount. Because Kava is so fibrous, it is not ground very quickly and tends to choke the hammer mill at standard feed rates. In the above described model of the preferred embodiment, the 8" pulley on the feed drive was changed to an 11⅜" pulley, and the feed drive motor r.p.m. was dropped from 1725 r.p.m. to 1140 r.p.m. In combination, these two changes slow the feed rate into the hammer mill by approximately two-thirds.

The second modification made to the Model B hammer mill is the provision of nitrogen gas to the interior of the hammer mill to prevent combustion of the Kava root. Because of its extremely fibrous nature, Kava root is subject to combustion during the grinding process. Combustion is prevented by replacing the air within the hammer mill with nitrogen, which prevents the Kava from catching on fire without otherwise damaging its nature. With the introduction of nitrogen gas into the interior of the hammer mill, grinding can take place at room temperature.

Modification of the above-described Model B hammer mill involves use of the two air-feed inlets found on the side of the anvil cover. One of these inlets can be covered up, with bottled nitrogen gas feed into the other at a relatively low rate. The feed rate of the nitrogen gas is selected to be just enough to replace most or all of the oxygen within the hammer mill. Feeding bottled nitrogen gas at a pressure of approximately 2 p.s.i.g. into one of the air feed inlets has been found to work sufficiently to prevent combustion of Kava root with the hammer mill. In some cases, it is only necessary to introduce oxygen during the second grinding stage, with the 0.093" screen. If desired, however, and depending upon the moisture content of the original Kava root, it may be desirable or necessary to flush the hammer mill interior during the final grinding stage also.

When commercially available Kava root is ground as described above, a fine powder results having a typical particle size of less than approximately 0.01". This very finely ground powder is suitable for use in drinks, foods, and other edibles because it is too small to have any objectionable fueling of the mill. Further, grinding the root so fine allows the availability of the active ingredients in the root to be relatively high. Thus, a smaller amount of raw root is needed to achieve an equivalent effect when the Kava root is ingested.

If the Kava powder is simply mixed with water or a similar drink, the strong taste is found objectionable by many people, particularly in western cultures. However, the taste may be masked or eliminated by any of several techniques. One technique is to mix the finely powdered root with other materials which have a strong flavor of their own, and which thereby mask the Kava taste. One technique for doing this is to include the power in candy bars or similar sweet confectionery. Another is to mix the Kava with materials traditionally used in drinks, such as cocoa. The taste is also fairly effectively masked in blended drinks traditionally known as "smoothies."

One preferred method for removing most of the objectionable taste from Kava power is to mix it with ascorbic acid. Similar food grade acids, such as citric acid, malic acid, lactic acid, and similar acids also cover the objectionable flavor of the finely ground Kava root. Ascorbic acid is preferred, but other acids may be more suitable in particular applications, and they may be mixed in different proportions.

A drink mix which contains finely ground Kava, and provides all of its benefits, can be made as follows: provide approximately 8% by dry weight ascorbic acid, 0.1%–5.0% stevia, with the remainder finely ground Kava powder prepared as described above. This results in a powder blend which can be mixed with water or other drinks to provide the benefits of Kava with an acceptable taste. In this drink, the stevia may be replaced with a sweetener such as a fructose or other sugar-based sweetener. However, the relative proportion of such a sweetener will need to be increased over the percentage described above. The proportions given above may vary relatively widely, depending an the materials mixed with the Kava root, and the intended end use of the mix. For example, the ascorbic or other acid may vary in the range of approximately 1% to 20%, and the sweetener or other additive material may vary in the range of approximately 0.1% to 10%.

By grinding the Kava extremely fine, a greater proportion of the active ingredients in the Kava root are made available. This is true whether the Kava is ultimately utilized in drink or mixed in with a solid food. When utilized in drink form, in particular, use of a food-grade acid removes most or all of the objectionable Kava taste, allowing it to be incorporated into many different drinks and food. The acceptability of the Kava root as a useful herb is greatly enhanced by masking or removing its natural flavor in this manner.

As will be apparent to those skilled in the art, variations in the methods and techniques described above will provide a useful product. While the invention has been particularly shown and described with reference to a preferred embodiment, it will be understood by those skilled in the art that various changes in form and detail may be made therein without departing from the spirit and scope of the invention.

What is claimed is:

1. A mix for a drink, comprising:
   ground Kava root, consisting substantially entirely of particles having a diameter less than approximately 0.02 inch;
   an organic acid; and
   a material providing a sweet taste to the mix.

2. The mix of claim 1, wherein the organic acid comprises an acid selected from the group consisting of ascorbic acid, citric acid, and malic acid.

3. The mix of claim 1, wherein the material providing a sweet taste comprises stevia.

4. A mix for a drink, comprising:
   ground Kava root, consisting substantially entirely of particles having a diameter less than approximately 0.02 inch; and
   a flavoring to improve the taste of drink made from the mix.

5. The mix of claim 4, wherein the flavoring comprises a cocoa based flavoring.

6. A mix for a drink, comprising:
   Kava root ground to a particle size less than approximately 0.02 inch, and having a proportion by weight of approximately 90%;
   ascorbic acid having a proportion by weight of approximately 8%; and
   stevia having a proportion by weight of approximately 1.6%.

7. A drink, comprising:
   water; and
   a mix in suspension in the water, the mix containing ground Kava root consisting substantially entirely of particles having a diameter less than approximately 0.02 inch, an organic acid, and a material providing a sweet taste to the mix.

8. The drink of claim 7, wherein the organic acid comprises an acid selected from the group consisting of ascorbic acid, citric acid, and malic acid.

9. The drink of claim 7, wherein the material providing a sweet taste comprises stevia.

10. The drink of claim 7, wherein the mix in suspension comprises:
    Kava root ground to a particle size less than approximately 0.02 inch, and having a proportion by weight of approximately 90%;
    ascorbic acid having a proportion by weight of approximately 8%; and
    stevia having a proportion by weight of approximately 1.6%.

* * * * *